(12) United States Patent
Varadharajan (10) Patent No.: US 8,719,264 B2
(45) Date of Patent: May 6, 2014

(54) CREATING SECONDARY COPIES OF DATA BASED ON SEARCHES FOR CONTENT (75) Inventor: Prakash Varadharajan, Manalapan, NJ (US)

(73) Assignee: CommVault Systems, Inc., Oceanport, NJ (US)

( * ) Notice: Subject to any disclaimer, the term of this patent is extended or adjusted under 35 U.S.C. 154(b) by 132 days.

(21) Appl. No.: 13/076,714

(22) Filed: Mar. 31, 2011

(65) Prior Publication Data

US 2012/0254115 A1 Oct. 4, 2012

(51) Int. Cl.
*G06F 7/00* (2006.01)
*G06F 17/30* (2006.01)

(52) U.S. Cl.
USPC ........................................................ 707/736

(58) Field of Classification Search
None
See application file for complete search history.

(56) References Cited

U.S. PATENT DOCUMENTS

| | | | |
|---|---|---|---|
| 4,686,620 A | 8/1987 | Ng | |
| 4,995,035 A | 2/1991 | Cole et al. | |
| 5,005,122 A | 4/1991 | Griffin et al. | |
| 5,093,912 A | 3/1992 | Dong et al. | |
| 5,133,065 A | 7/1992 | Cheffetz et al. | |
| 5,193,154 A | 3/1993 | Kitajima et al. | |
| 5,212,772 A | 5/1993 | Masters | |
| 5,226,157 A | 7/1993 | Nakano et al. | |
| 5,239,647 A | 8/1993 | Anglin et al. | |
| 5,241,668 A | 8/1993 | Eastridge et al. | |
| 5,241,670 A | 8/1993 | Eastridge et al. | |
| 5,276,860 A | 1/1994 | Fortier et al. | |
| 5,276,867 A | 1/1994 | Kenley et al. | |
| 5,287,500 A | 2/1994 | Stoppani, Jr. | |
| 5,321,816 A | 6/1994 | Rogan et al. | |
| 5,333,315 A | 7/1994 | Saether et al. | |
| 5,347,653 A | 9/1994 | Flynn et al. | |
| 5,410,700 A | 4/1995 | Fecteau et al. | |
| 5,448,724 A | 9/1995 | Hayashi | |
| 5,491,810 A | 2/1996 | Allen | |
| 5,495,607 A | 2/1996 | Pisello et al. | |
| 5,504,873 A | 4/1996 | Martin et al. | |
| 5,519,865 A | 5/1996 | Kondo et al. | |
| 5,544,345 A | 8/1996 | Carpenter et al. | |
| 5,544,347 A | 8/1996 | Yanai et al. | |
| 5,559,957 A | 9/1996 | Balk | |

(Continued)

FOREIGN PATENT DOCUMENTS

EP 0259912 A1 3/1988
EP 0405926 A2 1/1991

(Continued)

OTHER PUBLICATIONS

Harrison, CDIA Training & Test Preparation Guide 2000, Specialized Solutions, p. 52.*

(Continued)

*Primary Examiner* — Jason Liao
(74) *Attorney, Agent, or Firm* — Perkins Coie LLP (57) ABSTRACT

A method and system for creating secondary copies of data whose contents satisfy searches within data stores is described. In some cases, the system searches for data within a data store, identifies a set of data that satisfies the search, copies the identified set of data, and transfers the copy to secondary or other storage. In some cases, the system utilizes search-based secondary copies of days during restoration processes in order to restore data similar to and/or associated with data requested to be restored.

19 Claims, 6 Drawing Sheets

(56) References Cited

U.S. PATENT DOCUMENTS

| | | | |
|---|---|---|---|
| 5,590,318 A | 12/1996 | Zbikowski et al. | |
| 5,619,644 A | 4/1997 | Crockett et al. | |
| 5,623,679 A * | 4/1997 | Rivette et al. | 715/255 |
| 5,638,509 A | 6/1997 | Dunphy et al. | |
| 5,673,381 A | 9/1997 | Huai et al. | |
| 5,699,361 A | 12/1997 | Ding et al. | |
| 5,729,743 A | 3/1998 | Squibb | |
| 5,737,747 A | 4/1998 | Vishlitzky et al. | |
| 5,751,997 A | 5/1998 | Kullick et al. | |
| 5,758,359 A | 5/1998 | Saxon | |
| 5,761,677 A | 6/1998 | Senator et al. | |
| 5,764,972 A | 6/1998 | Crouse et al. | |
| 5,778,395 A | 7/1998 | Whiting et al. | |
| 5,812,398 A | 9/1998 | Nielsen | |
| 5,813,009 A | 9/1998 | Johnson et al. | |
| 5,813,017 A | 9/1998 | Morris | |
| 5,829,046 A | 10/1998 | Tzelnic et al. | |
| 5,832,510 A | 11/1998 | Ito et al. | |
| 5,875,478 A | 2/1999 | Blumenau | |
| 5,887,134 A | 3/1999 | Ebrahim | |
| 5,892,917 A | 4/1999 | Myerson | |
| 5,901,327 A | 5/1999 | Ofek | |
| 5,907,621 A | 5/1999 | Bachman et al. | |
| 5,918,232 A * | 6/1999 | Pouschine et al. | 1/1 |
| 5,924,102 A | 7/1999 | Perks | |
| 5,950,205 A | 9/1999 | Aviani, Jr. | |
| 5,953,721 A | 9/1999 | Doi et al. | |
| 5,974,563 A | 10/1999 | Beeler, Jr. | |
| 6,006,225 A | 12/1999 | Bowman et al. | |
| 6,021,415 A | 2/2000 | Cannon et al. | |
| 6,023,710 A | 2/2000 | Steiner et al. | |
| 6,026,414 A | 2/2000 | Anglin | |
| 6,052,735 A | 4/2000 | Ulrich et al. | |
| 6,061,692 A | 5/2000 | Thomas et al. | |
| 6,076,148 A | 6/2000 | Kedem | |
| 6,088,697 A | 7/2000 | Crockett et al. | |
| 6,092,062 A * | 7/2000 | Lohman et al. | 1/1 |
| 6,094,416 A | 7/2000 | Ying | |
| 6,131,095 A | 10/2000 | Low et al. | |
| 6,131,190 A | 10/2000 | Sidwell | |
| 6,148,412 A | 11/2000 | Cannon et al. | |
| 6,154,787 A | 11/2000 | Urevig et al. | |
| 6,154,852 A | 11/2000 | Amundson et al. | |
| 6,161,111 A | 12/2000 | Mutalik et al. | |
| 6,167,402 A | 12/2000 | Yeager | |
| 6,175,829 B1 | 1/2001 | Li et al. | |
| 6,212,512 B1 | 4/2001 | Barney et al. | |
| 6,260,069 B1 | 7/2001 | Anglin | |
| 6,269,431 B1 | 7/2001 | Dunham | |
| 6,275,953 B1 | 8/2001 | Vahalia et al. | |
| 6,301,592 B1 | 10/2001 | Aoyama et al. | |
| 6,324,581 B1 | 11/2001 | Xu et al. | |
| 6,328,766 B1 | 12/2001 | Long | |
| 6,330,570 B1 | 12/2001 | Crighton | |
| 6,330,642 B1 | 12/2001 | Carteau | |
| 6,343,324 B1 | 1/2002 | Hubis et al. | |
| RE37,601 E | 3/2002 | Eastridge et al. | |
| 6,356,801 B1 | 3/2002 | Goodman et al. | |
| 6,374,336 B1 | 4/2002 | Peters et al. | |
| 6,389,432 B1 | 5/2002 | Pothapragada et al. | |
| 6,418,478 B1 | 7/2002 | Ignatius et al. | |
| 6,421,683 B1 | 7/2002 | Lamburt | |
| 6,421,711 B1 | 7/2002 | Blumenau et al. | |
| 6,421,779 B1 | 7/2002 | Kuroda et al. | |
| 6,430,575 B1 | 8/2002 | Dourish et al. | |
| 6,438,586 B1 | 8/2002 | Hass et al. | |
| 6,487,561 B1 | 11/2002 | Ofek et al. | |
| 6,487,644 B1 | 11/2002 | Huebsch et al. | |
| 6,499,026 B1 * | 12/2002 | Rivette et al. | 1/1 |
| 6,507,852 B1 | 1/2003 | Dempsey et al. | |
| 6,516,314 B1 | 2/2003 | Birkler et al. | |
| 6,519,679 B2 | 2/2003 | Devireddy et al. | |
| 6,538,669 B1 | 3/2003 | Lagueux, Jr. et al. | |
| 6,542,909 B1 | 4/2003 | Tamer et al. | |
| 6,542,972 B2 | 4/2003 | Ignatius et al. | |
| 6,564,228 B1 | 5/2003 | O'Connor | |
| 6,581,143 B2 | 6/2003 | Gagne et al. | |
| 6,625,623 B1 | 9/2003 | Midgley et al. | |
| 6,647,396 B2 | 11/2003 | Parnell et al. | |
| 6,658,436 B2 | 12/2003 | Oshinsky et al. | |
| 6,658,526 B2 | 12/2003 | Nguyen et al. | |
| 6,732,124 B1 | 5/2004 | Koseki et al. | |
| 6,763,351 B1 | 7/2004 | Subramaniam et al. | |
| 6,772,164 B2 | 8/2004 | Reinhardt | |
| 6,775,790 B2 | 8/2004 | Reuter et al. | |
| 6,785,864 B1 | 8/2004 | Te et al. | |
| 6,834,329 B2 | 12/2004 | Sasaki et al. | |
| 6,836,779 B2 | 12/2004 | Poulin | |
| 6,847,984 B1 | 1/2005 | Midgley et al. | |
| 6,857,053 B2 | 2/2005 | Bolik et al. | |
| 6,871,163 B2 | 3/2005 | Hiller et al. | |
| 6,886,020 B1 | 4/2005 | Zahavi et al. | |
| 6,947,935 B1 | 9/2005 | Horvitz et al. | |
| 6,983,322 B1 | 1/2006 | Tripp et al. | |
| 6,996,616 B1 | 2/2006 | Leighton et al. | |
| 7,003,519 B1 | 2/2006 | Biettron et al. | |
| 7,035,880 B1 | 4/2006 | Crescenti et al. | |
| 7,047,236 B2 | 5/2006 | Conroy et al. | |
| 7,085,787 B2 | 8/2006 | Beier et al. | |
| 7,103,740 B1 | 9/2006 | Colgrove et al. | |
| 7,130,860 B2 | 10/2006 | Pachet et al. | |
| 7,130,970 B2 | 10/2006 | Devassy et al. | |
| 7,149,750 B2 | 12/2006 | Chadwick | |
| 7,165,082 B1 | 1/2007 | DeVos | |
| 7,167,895 B1 | 1/2007 | Connelly | |
| 7,171,619 B1 | 1/2007 | Bianco | |
| 7,181,444 B2 | 2/2007 | Porter et al. | |
| 7,194,454 B2 | 3/2007 | Hansen et al. | |
| 7,197,502 B2 | 3/2007 | Feinsmith | |
| 7,200,726 B1 | 4/2007 | Gole et al. | |
| 7,240,100 B1 | 7/2007 | Wein et al. | |
| 7,246,207 B2 | 7/2007 | Kottomtharayil et al. | |
| 7,246,211 B1 | 7/2007 | Beloussov et al. | |
| 7,269,612 B2 | 9/2007 | Devarakonda et al. | |
| 7,272,606 B2 | 9/2007 | Borthakur et al. | |
| 7,330,997 B1 | 2/2008 | Odom | |
| 7,343,365 B2 | 3/2008 | Farnham et al. | |
| 7,346,623 B2 | 3/2008 | Prahlad et al. | |
| 7,346,676 B1 | 3/2008 | Swildens et al. | |
| 7,356,657 B2 | 4/2008 | Mikami | |
| 7,356,660 B2 | 4/2008 | Matsunami et al. | |
| 7,359,917 B2 | 4/2008 | Winter et al. | |
| 7,366,859 B2 | 4/2008 | Per et al. | |
| 7,386,663 B2 | 6/2008 | Cousins | |
| 7,395,282 B1 | 7/2008 | Crescenti et al. | |
| 7,430,587 B2 | 9/2008 | Malone et al. | |
| 7,433,301 B2 | 10/2008 | Akahane et al. | |
| 7,440,966 B2 | 10/2008 | Adkins et al. | |
| 7,440,984 B2 | 10/2008 | Augenstein et al. | |
| 7,454,569 B2 | 11/2008 | Kavuri et al. | |
| 7,496,589 B1 | 2/2009 | Jain et al. | |
| 7,500,150 B2 | 3/2009 | Sharma et al. | |
| 7,509,316 B2 | 3/2009 | Greenblatt et al. | |
| 7,512,601 B2 | 3/2009 | Cucerzan et al. | |
| 7,512,814 B2 | 3/2009 | Chen et al. | |
| 7,529,748 B2 | 5/2009 | Wen et al. | |
| 7,532,340 B2 | 5/2009 | Koppich et al. | |
| 7,533,103 B2 | 5/2009 | Brendle et al. | |
| 7,533,181 B2 | 5/2009 | Dawson et al. | |
| 7,533,230 B2 | 5/2009 | Glover et al. | |
| 7,583,861 B2 | 9/2009 | Hanna et al. | |
| 7,584,227 B2 | 9/2009 | Gokhale et al. | |
| 7,590,997 B2 | 9/2009 | Diaz Perez | |
| 7,613,728 B2 | 11/2009 | Png et al. | |
| 7,613,752 B2 | 11/2009 | Prahlad et al. | |
| 7,617,541 B2 | 11/2009 | Plotkin et al. | |
| 7,620,710 B2 | 11/2009 | Kottomtharayil et al. | |
| 7,624,443 B2 | 11/2009 | Kramer et al. | |
| 7,627,598 B1 | 12/2009 | Burke | |
| 7,627,617 B2 | 12/2009 | Kavuri et al. | |
| 7,631,151 B2 | 12/2009 | Prahlad et al. | |
| 7,634,478 B2 | 12/2009 | Yang et al. | |
| 7,657,550 B2 | 2/2010 | Prahlad et al. | |
| 7,660,800 B2 | 2/2010 | Prahlad et al. | |

(56) References Cited

U.S. PATENT DOCUMENTS

| | | | |
|---|---|---|---|
| 7,660,807 B2 | 2/2010 | Prahlad et al. | |
| 7,668,798 B2 | 2/2010 | Scanlon et al. | |
| 7,668,884 B2 | 2/2010 | Prahlad et al. | |
| 7,672,962 B2 | 3/2010 | Arrouye et al. | |
| 7,693,856 B2 | 4/2010 | Arrouye et al. | |
| 7,707,178 B2 | 4/2010 | Prahlad et al. | |
| 7,711,700 B2 | 5/2010 | Prahlad et al. | |
| 7,716,171 B2 | 5/2010 | Kryger | |
| 7,716,191 B2 | 5/2010 | Blumenau et al. | |
| 7,720,801 B2 | 5/2010 | Chen | |
| 7,725,605 B2 | 5/2010 | Palmeri et al. | |
| 7,725,671 B2 | 5/2010 | Prahlad et al. | |
| 7,734,593 B2 | 6/2010 | Prahlad et al. | |
| 7,734,669 B2 | 6/2010 | Kottomtharayil et al. | |
| 7,734,715 B2 | 6/2010 | Hyakutake et al. | |
| 7,747,579 B2 | 6/2010 | Prahlad et al. | |
| 7,756,837 B2 | 7/2010 | Williams et al. | |
| 7,801,864 B2 | 9/2010 | Prahlad et al. | |
| 7,818,215 B2 | 10/2010 | King et al. | |
| 7,822,749 B2 | 10/2010 | Prahlad et al. | |
| 7,831,553 B2 | 11/2010 | Prahlad et al. | |
| 7,831,622 B2 | 11/2010 | Prahlad et al. | |
| 7,831,795 B2 | 11/2010 | Prahlad et al. | |
| 7,840,537 B2 | 11/2010 | Gokhale et al. | |
| 7,840,619 B2 | 11/2010 | Horn | |
| 7,841,011 B2 * | 11/2010 | Manson et al. | 726/28 |
| 7,849,059 B2 | 12/2010 | Prahlad et al. | |
| 7,890,467 B2 | 2/2011 | Watanabe et al. | |
| 7,890,469 B1 | 2/2011 | Maionchi et al. | |
| 7,925,856 B1 | 4/2011 | Greene | |
| 7,933,920 B2 | 4/2011 | Kojima et al. | |
| 7,962,709 B2 | 6/2011 | Agrawal | |
| 7,966,495 B2 | 6/2011 | Ackerman et al. | |
| 8,041,677 B2 | 10/2011 | Sumner et al. | |
| 8,051,045 B2 | 11/2011 | Vogler | |
| 8,229,954 B2 | 7/2012 | Kottomtharayil et al. | |
| 2001/0047365 A1 | 11/2001 | Yonaitis | |
| 2002/0049626 A1 | 4/2002 | Mathias et al. | |
| 2002/0069324 A1 | 6/2002 | Gerasimov et al. | |
| 2002/0087550 A1 | 7/2002 | Carlyle et al. | |
| 2002/0147734 A1 | 10/2002 | Shoup et al. | |
| 2002/0161753 A1 | 10/2002 | Inaba et al. | |
| 2003/0018607 A1 | 1/2003 | Lennon et al. | |
| 2003/0046313 A1 | 3/2003 | Leung et al. | |
| 2003/0101183 A1 | 5/2003 | Kabra et al. | |
| 2003/0130993 A1 | 7/2003 | Mendelevitch et al. | |
| 2003/0182583 A1 | 9/2003 | Turco | |
| 2004/0015514 A1 | 1/2004 | Melton et al. | |
| 2004/0254919 A1 | 12/2004 | Giuseppini | |
| 2004/0260678 A1 | 12/2004 | Verbowski et al. | |
| 2004/0260973 A1 * | 12/2004 | Michelman | 714/13 |
| 2005/0010588 A1 | 1/2005 | Zalewski et al. | |
| 2005/0050075 A1 | 3/2005 | Okamoto et al. | |
| 2005/0055352 A1 | 3/2005 | White et al. | |
| 2005/0055386 A1 | 3/2005 | Tosey | |
| 2005/0086231 A1 | 4/2005 | Moore | |
| 2005/0154695 A1 | 7/2005 | Gonzalez et al. | |
| 2005/0187937 A1 | 8/2005 | Kawabe et al. | |
| 2005/0188248 A1 | 8/2005 | O'Brien et al. | |
| 2005/0216453 A1 | 9/2005 | Sasaki et al. | |
| 2005/0228794 A1 | 10/2005 | Navas et al. | |
| 2005/0262097 A1 | 11/2005 | Sim-Tang et al. | |
| 2006/0004820 A1 | 1/2006 | Claudatos et al. | |
| 2006/0010227 A1 | 1/2006 | Atluri | |
| 2006/0224846 A1 | 10/2006 | Amarendran et al. | |
| 2006/0230082 A1 | 10/2006 | Jasrasaria | |
| 2006/0259468 A1 | 11/2006 | Brooks et al. | |
| 2006/0259527 A1 | 11/2006 | Devarakonda et al. | |
| 2007/0033191 A1 | 2/2007 | Hornkvist et al. | |
| 2007/0043956 A1 | 2/2007 | El Far et al. | |
| 2007/0067304 A1 | 3/2007 | Ives | |
| 2007/0100867 A1 | 5/2007 | Celik et al. | |
| 2007/0174273 A1 * | 7/2007 | Jones et al. | 707/5 |
| 2007/0185915 A1 | 8/2007 | Prahlad et al. | |
| 2007/0185926 A1 | 8/2007 | Prahlad et al. | |
| 2007/0192385 A1 | 8/2007 | Prahlad et al. | |
| 2007/0203938 A1 | 8/2007 | Prahlad et al. | |
| 2007/0282680 A1 | 12/2007 | Davis et al. | |
| 2007/0288536 A1 | 12/2007 | Sen et al. | |
| 2008/0059495 A1 | 3/2008 | Kiessig et al. | |
| 2008/0059515 A1 | 3/2008 | Fulton | |
| 2008/0077594 A1 | 3/2008 | Ota | |
| 2008/0091655 A1 | 4/2008 | Gokhale et al. | |
| 2008/0091747 A1 | 4/2008 | Prahlad et al. | |
| 2008/0183662 A1 | 7/2008 | Reed et al. | |
| 2008/0228771 A1 | 9/2008 | Prahlad et al. | |
| 2008/0229037 A1 | 9/2008 | Bunte et al. | |
| 2008/0243796 A1 | 10/2008 | Prahlad et al. | |
| 2008/0249996 A1 | 10/2008 | Prahlad et al. | |
| 2008/0294605 A1 | 11/2008 | Prahlad et al. | |
| 2009/0287665 A1 | 11/2009 | Prahlad et al. | |
| 2009/0319534 A1 | 12/2009 | Gokhale | |
| 2009/0319585 A1 | 12/2009 | Gokhale | |
| 2010/0057870 A1 | 3/2010 | Ahn et al. | |
| 2010/0082672 A1 | 4/2010 | Kottomtharayil et al. | |
| 2010/0114952 A1 | 5/2010 | Scanlon et al. | |
| 2010/0131461 A1 | 5/2010 | Prahlad et al. | |
| 2010/0179941 A1 | 7/2010 | Agrawal et al. | |
| 2010/0205150 A1 | 8/2010 | Prahlad et al. | |
| 2010/0250549 A1 | 9/2010 | Muller et al. | |
| 2010/0299490 A1 | 11/2010 | Attarde et al. | |
| 2011/0047180 A1 | 2/2011 | Prahlad et al. | |
| 2011/0093470 A1 | 4/2011 | Gokhale et al. | |
| 2011/0181383 A1 | 7/2011 | Lotfi et al. | |
| 2011/0276664 A1 | 11/2011 | Prahlad et al. | |
| 2012/0215745 A1 | 8/2012 | Prahlad et al. | |

FOREIGN PATENT DOCUMENTS

| | | |
|---|---|---|
| EP | 0467546 A2 | 1/1992 |
| EP | 0774715 A1 | 5/1997 |
| EP | 0809184 A1 | 11/1997 |
| EP | 0899662 A1 | 3/1999 |
| EP | 0981090 A1 | 2/2000 |
| EP | 1174795 | 1/2002 |
| WO | WO-9412944 | 6/1994 |
| WO | WO-9513580 A1 | 5/1995 |
| WO | WO-9912098 A1 | 3/1999 |
| WO | WO-9914692 A1 | 3/1999 |
| WO | WO-0106368 A1 | 1/2001 |
| WO | WO-0193537 | 12/2001 |
| WO | WO-03060774 A1 | 7/2003 |
| WO | WO-2004010375 A3 | 6/2004 |
| WO | WO-2004063863 A3 | 3/2005 |
| WO | WO-2005055093 A2 | 6/2005 |
| WO | WO-2007062254 A2 | 5/2007 |
| WO | WO-2007062429 A2 | 5/2007 |
| WO | WO-2008049023 A2 | 4/2008 |

OTHER PUBLICATIONS

Quick Reference Guide for West and EAST [date unknown, but verified as of Sep. 13, 2007], Search and Information Resource Administration, 2 pages.*

User's Manual for the Examiners Automated Search Tool (EAST) Jul. 22, 1999, Version 1.0, 179 pages.* iSeries information Center date unknown [Accessed on Aug. 20, 2013], IBM, http://publib.boulder.ibm.com/infocenter/iseries/v5r3/index.jsp?topic=%2Frzam4%2Frzam4tapevsoptical.htm*

U.S. Appl. No. 13/538,862, filed Jun. 29, 2012, Prahlad et al.

U.S. Appl. No. 13/616,197, filed Sep. 14, 2012, Prahlad et al.

"Titus Labs—Announces Document Classification for Microsoft Word" Nov. 3, 2005 (Nov. 3, 2005), XP55034835, available at http://web.archive.org/web/20051126093136/http://www.titus-labs.com/about/DocClassRelease.html, 1 page.

Titus Labs Document Classification V1.1 for Microsoft Word—Document Policy Enforcement, avaliable at: <http://web.archive.org/web/20060104112621/www.titus-labs.com/includes/PDF/Doc-ClassDataSheet.pdf>, Nov. 3, 2005, 2 pages.

U.S. Appl. No. 12/978,050, filed Dec. 23, 2012, Pawar.

U.S. Appl. No. 13/076,634, filed Mar. 31, 2011, Prahlad et al.

U.S. Appl. No. 13/077,516, filed Mar. 3, 2011, Prahlad et al.

(56) References Cited

OTHER PUBLICATIONS

"Text Figures", retrieved from http://www.microsoft.com/msj/1198.ntfs/ntfstextfigs.htm on Nov. 10, 2005, 7 pages.

Armstead et al., "Implementation of a Campus-wide Distributed Mass Storage Service: The Dream vs. Reality," IEEE, 1995, pp. 190-199.

Arneson, "Mass Storage Archiving in Network Environments," Digest of Papers, Ninth IEEE Symposium on Mass Storage Systems, Oct. 31, 1988-Nov. 3, 1988, pp. 45-50, Monterey, CA.

Arneson, David A., "Development of Omniserver," Control Data Corporation, Tenth IEEE Symposium on Mass Storage Systems, May 1990, 'Crisis in Mass Storage' Digest of Papers, pp. 88-93, Monterey, CA.

Bowman et al. "Harvest: A Scalable, Customizable Discovery and Access System," Department of Computer Science, University of Colorado—Boulder, Revised Mar. 1995, 29 pages.

Brad O'Neill, "New Tools to Classify Data," Storage Magazine, Aug. 2005, 4 pages.

Cabrera et al., "ADSM: A Multi-Platform, Scalable, Backup and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.

Communication with extended European Search Report for Application No. PCT/US2006/061304, dated Dec. 30, 2008.

Eitel, "Backup and Storage Management in Distributed Heterogeneous Environments," IEEE, 1994, pp. 124-126.

EMC Corporation, "Today's Choices for Business Continuity," 2004, 12 pages.

European Patent Office Examination Report for EP application 06846386.8, Mail Date Apr. 29, 2009, 6 pages.

Farley, M., "Storage Network Fundamentals,, Network Backup: The Foundation of Storage Management, Data Management," Storage Networking Fundamentals: an Introduction to Storage Devices, Subsystems, Applications, Management, and Filing [File] Systems, Cisco Press, Jan. 1, 2005, 9 pages.

Jander, M., "Launching Storage-Area Net," *Data Communications,* US, McGraw Hill, NY, vol. 27, No. 4 (Mar. 21, 1998), pp. 64-72.

Jason Gait, "The Optical File Cabinet: A Random-Access File System for Write-Once Optical Disks," IEEE Computer, vol. 21, No. 6, pp. 11-22 (1988) (see in particular figure 5 in p. 15 and recitation in claim 5).

Jeffrey Cooperstein and Jeffrey Richter, "Keeping an Eye on Your NTFS Drives, Part II: Building a Change Journal Application," Microsoft Systems Journal, Oct. 1999, 14 pages.

Jeffrey Cooperstein and Jeffrey Richter, "Keeping an Eye on Your NTFS Drives: the Windows 2000 Change Journal Explained," Microsoft Systems Journal, Sep. 1999, 17 pages.

Jeffrey Richter and Luis Felipe Cabrera, "A File System for the 21st Century: Previewing the Windows NT 5.0 File System," and attached text figures, Microsoft Systems Journal, Nov. 1998, 24 pages.

Karl Langdon and John Merryman, "Data Classification: Getting Started," Storage Magazine, Jul. 2005, 3 pages.

Manber et al., "WebGlimpse—Combining Browsing and Searching," 1997 Usenix Technical Conference, Jan., 1997, 12 pages.

Microsoft Developer Network, "GetFileAttributes," online library article, [accessed on Nov. 10, 2005], 3 pages.

Microsoft Developer Network, "GetFileAttributesEx," online library article, [accessed on Nov. 10, 2005], 2 pages.

Microsoft Developer Network, "Win32_File_Attribute_Data," online library article, [accessed on Nov. 10, 2005], 3 pages.

Partial International Search Results, mailed May 25, 2007, International Application No. PCT/US2006/045556, 2 pages.

Rosenblum et al., "The Design and Implementation of a Log-Structured File System," *Operating Systems Review SIGOPS,* vol. 25, No. 5, New York, US, pp. 1-15 (May 1991).

Supplementary European Search Report for European Application EP06846386, Dated Dec. 20, 2008, European Patent Office, 6 pages.

Bhagwan, R. et al. "Total Recall: System Support for Automated Availability Management," Proceedings of the 1st Conference on Symposium on Networked Systems Design and Implementation, vol. 1, Mar. 3, 2004, XP055057350, Berkeley, CA, 14 pages.

Extended European Search Report for European Application No. EP11003795, Mail Date Nov. 21, 2012, 20 pages.

\* cited by examiner

CREATING SECONDARY COPIES OF DATA BASED ON SEARCHES FOR CONTENT

BACKGROUND

Data storage systems facilitate the retention of electronic data produced by computing systems. Often, data is stored remotely from a computing system, in secondary or even tertiary storage devices. Example storage devices may include magnetic tapes, optical disks, flash memory, and so on. Data is retained for a wide variety of purposes, such as for compliance purposes or backup purposes.

Currently, there are many data storage systems capable of restoring data from remote storage devices. Typically, during restoration the systems will attempt to identify specific data elements within massive data stores. For example, during a legal discovery process, a data restore system may review large amounts of data before resolving a certain data recovery request, which may be expensive and overwhelm associated computing and human resources, among other problems.

There is a need for a system that overcomes the above problems, as well as providing additional benefits.

DETAILED DESCRIPTION

Overview

A method and system for creating secondary copies of data identified during searches within a data store is described. That is, in some examples, a backup copy is made of the results of a search for data whose contents satisfy a certain search criteria. The search, which may be performed within secondary storage media, tertiary storage media, primary storage media, or other storage media, and information (i.e., search criteria) associated with the search may be leveraged when creating and/or generating copies of data for backup and other data retention purposes. Thus, in some examples, the system may stage or create copies of data tailored for anticipated or future restoration and other data retrieval tasks, among other benefits.

In some examples, the system creates secondary copies of data that satisfy search criteria as well as other data, such as data that satisfy other search criteria associated with the search criteria. For example, the system may create a secondary copy for all data that include a company name in response to a search for the company name as well as all data that include the name of a subsidiary of the company. In some examples, the system may create copies of data based on a search for content within the data and content associated with the searched content, among other benefits.

In some examples, the system may restore data associated with data that is part of a restoration request. For example, the system may receive a request to restore data produced during a certain time period, locate the data within a secondary copy of data that satisfied the criteria of a previous search for data, and restore the secondary copy. Thus, in some examples, the system may, in response to a data recovery request, restore data associated with the requested data in order to anticipate additional recovery requests, among other benefits.

The system will now be described with respect to various embodiments. The following description provides specific details for a thorough understanding of, and enabling description for, these embodiments of the system. However, one skilled in the art will understand that the system may be practiced without these details. In other instances, well-known structures and functions have not been shown or described in detail to avoid unnecessarily obscuring the description of the embodiments of the system.

The terminology used in the description presented below is intended to be interpreted in its broadest reasonable manner, even though it is being used in conjunction with a detailed description of certain specific embodiments of the system. Certain terms may even be emphasized below; however, any terminology intended to be interpreted in any restricted manner will be overtly and specifically defined as such in this Detailed Description section.

Suitable System

Figure 1:
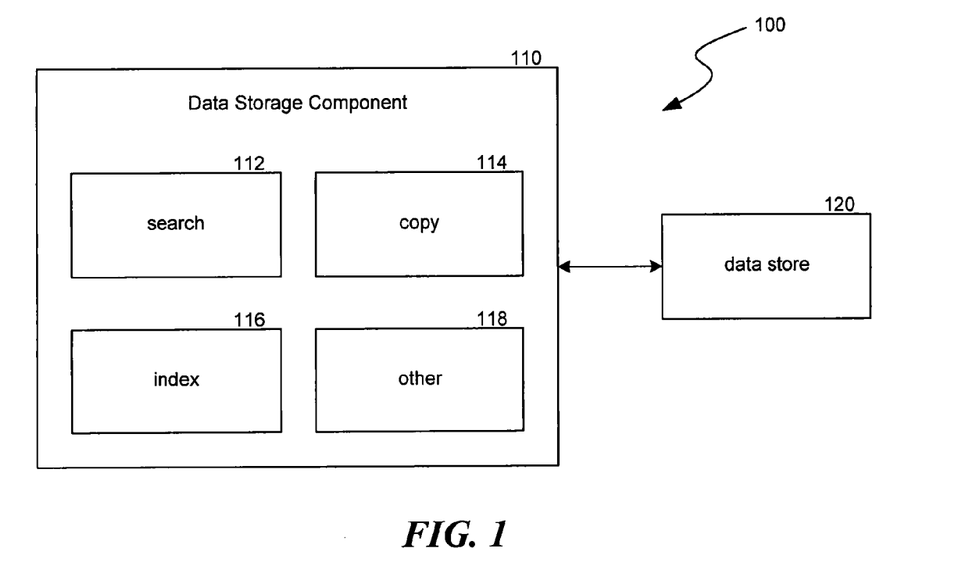
FIG. 1 is a block diagram illustrating a computing environment in which aspects of the system may be implemented.
Figure 2:
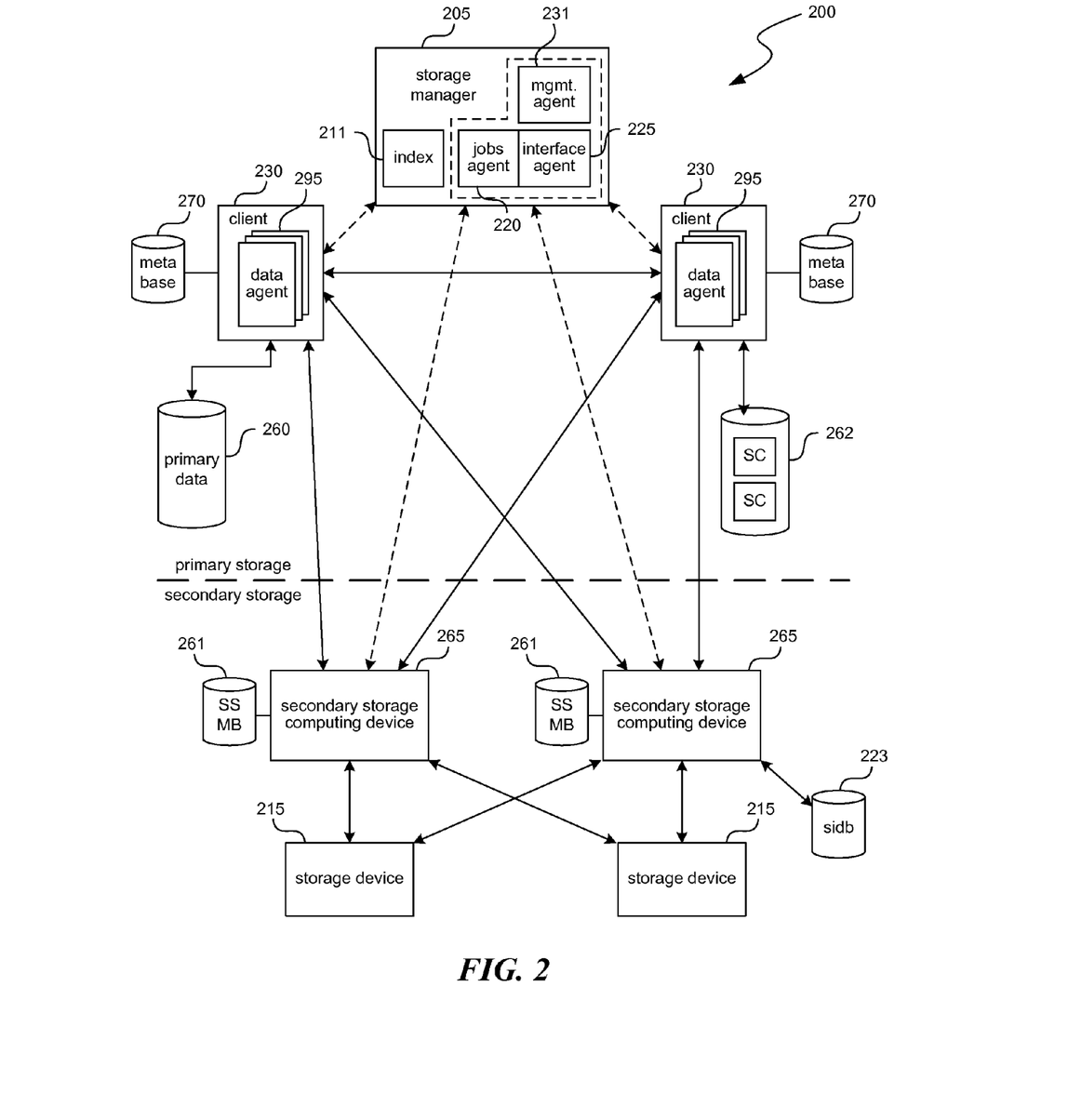
FIG. 2 is a block diagram illustrating a suitable data storage system in which aspects of the system may be implemented.

FIGS. 1 and 2 and the following discussion provide a brief, general description of a suitable computing environment in which the system can be implemented. Although not required, aspects of the system are described in the general context of computer-executable instructions, such as routines executed by a general-purpose computer, e.g., a server computer, wireless device or personal computer. Those skilled in the relevant art will appreciate that the system can be practiced with other communications, data processing, or computer system configurations, including: Internet appliances, network PCs, mini-computers, mainframe computers, and the like. Indeed, the terms "computer," "host," and "host computer" are generally used interchangeably herein, and refer to any of the above devices and systems, as well as any data processor.

Aspects of the system can be embodied in a special purpose computer or data processor that is specifically programmed, configured, or constructed to perform one or more of the computer-executable instructions explained in detail herein. Aspects of the system can also be practiced in distributed computing environments where tasks or modules are performed by remote processing devices, which are linked through a communications network, such as a Local Area Network (LAN), Wide Area Network (WAN), Storage Area Network (SAN), Fibre Channel, or the Internet. In a distributed computing environment, program modules may be located in both local and remote memory storage devices.

Aspects of the system may be stored or distributed on computer-readable media, including magnetically or optically readable computer discs, hard-wired or preprogrammed chips (e.g., EEPROM semiconductor chips), nanotechnology memory, biological memory, or other data storage media. Indeed, computer implemented instructions, data structures, screen displays, and other data under aspects of the system may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme). Those skilled in the relevant art will recognize that portions of the system reside on a server computer, while corresponding portions reside on a client computer, and thus, while certain hardware platforms are described herein, aspects of the system are equally applicable to nodes on a network.

FIG. 1 is a block diagram illustrating a computing environment 100 in which aspects of the system may be implemented. The environment 100 includes a data storage component 110 and a data store 120, which may be part of a data storage system, such as data storage system 200 of FIG. 2, to be discussed herein.

Data storage component 110 includes a search component 112, a copy component 114, an index component 116, and other components 118, such as restore components, databases, user interface components, and so on. The data storage component 110 may transfer and/or retrieve data from a data store 120. The data store 120 may be a secondary storage device, a tertiary storage device, or other storage devices.

In some examples of the system, the search component 112 searches the data store 120 for data satisfying received or input criteria. In some cases, the search component 112 may receive criteria associated with data to be restored from the data store 120, and search the data store 120 for data satisfying the criteria of the restoration request. In some cases, the search component 112 may receive a request to search for data whose contents satisfy certain search criteria, such as criteria associated with anticipated data recovery or data identification requests. Further details regarding the search component 112 may be found in commonly-assigned U.S. patent application Ser. No. 11/931,034, which is incorporated by reference in its entirety.

In some examples of the system, the copy component 114 creates a copy of the results of searches performed by the search component 112. In some cases, the copy component 114 may create a secondary copy of data satisfying search criteria, such as a backup copy, an archive copy, and so on.

In some examples of the system, the index component 116 creates and/or updates an index associated with the data store 120, such as an index that relates the data stored in the data store with locations in the data store that contain the data. The index may also include other data, such as metadata associated with the stored data, metadata associated with creation of copies, and other information.

Further details regarding the components and processes utilized in the creating and storage of data, such as data stored within data store 120 and/or copies created by copy component 114, will now be discussed with respect to FIG. 2. FIG. 2 is a block diagram illustrating various components and resources of a suitable data storage system 200.

The resources in the data storage system 200 may employ the processes and techniques described herein. The data storage system 200 includes a storage manager 205, one or more data agents 295, one or more secondary storage computing devices 265, one or more storage devices 215, one or more clients 230, one or more data or information stores 260 and 262, a single instancing database 223, an index 211, a jobs agent 220, an interface agent 225, and a management agent 231. The system 200 may represent a modular storage system such as the CommVault QiNetix system, and also the CommVault GALAXY backup system, available from CommVault Systems, Inc. of Oceanport, N.J., aspects of which are further described in commonly-assigned U.S. Pat. No. 7,035,880, the entirety of which is incorporated by reference herein. The system 200 may also represent a modular storage system such as the CommVault Simpana system, also available from CommVault Systems, Inc.

The data storage system 200 may generally include combinations of hardware and software components associated with performing storage operations on electronic data. Storage operations include copying, backing up, creating, storing, retrieving, and/or migrating primary storage data (e.g., data stores 260 and/or 262) and secondary storage data (which may include, for example, snapshot copies, backup copies, HSM copies, archive copies, and other types of copies of electronic data stored on storage devices 215). The system 200 may provide one or more integrated management consoles for users or system processes to interface with in order to perform certain storage operations on electronic data as further described herein. Such integrated management consoles may be displayed at a central control facility or several similar consoles distributed throughout multiple network locations to provide global or geographically specific network data storage information.

In some examples, storage operations may be performed according to various storage preferences, for example, as expressed by a user preference, a storage policy, a schedule policy, and/or a retention policy. A "storage policy" is generally a data structure or other information source that includes a set of preferences and other storage criteria associated with performing a storage operation. The preferences and storage criteria may include, but are not limited to, a storage location, relationships between system components, network pathways to utilize in a storage operation, data characteristics, compression or encryption requirements, preferred system components to utilize in a storage operation, a single instancing or variable instancing policy to apply to the data, and/or other criteria relating to a storage operation. For example, a storage policy may indicate that certain data is to be stored in the storage device 215, retained for a specified period of time before being aged to another tier of secondary storage, copied to the storage device 215 using a specified number of data streams, and so on.

A "schedule policy" may specify a frequency with which to perform storage operations and a window of time within which to perform them. For example, a schedule policy may specify that a storage operation is to be performed every Saturday morning from 2:00 a.m. to 4:00 a.m. In some cases, the storage policy includes information generally specified by the schedule policy. (Put another way, the storage policy includes the schedule policy.) Storage policies and/or schedule policies may be stored in a database of the storage manager 205, to archive media as metadata for use in restore operations or other storage operations, or to other locations or components of the system 200.

The system 200 may comprise a storage operation cell that is one of multiple storage operation cells arranged in a hierarchy or other organization. Storage operation cells may be related to backup cells and provide some or all of the functionality of backup cells as described in commonly-assigned U.S. Pat. No. 7,395,282, which is incorporated herein by reference in its entirety. However, storage operation cells may also perform additional types of storage operations and other types of storage management functions that are not generally offered by backup cells.

Storage operation cells may contain not only physical devices, but also may represent logical concepts, organizations, and hierarchies. For example, a first storage operation cell may be configured to perform a first type of storage operations such as HSM operations, which may include backup or other types of data migration, and may include a variety of physical components including a storage manager 205 (or management agent 231), a secondary storage computing device 265, a client 230, and other components as described herein. A second storage operation cell may contain the same or similar physical components; however, it may be configured to perform a second type of storage operations, such as storage resource management ("SRM") operations, and may include monitoring a primary data copy or performing other known SRM operations.

Thus, as can be seen from the above, although the first and second storage operation cells are logically distinct entities configured to perform different management functions (HSM and SRM, respectively), each storage operation cell may contain the same or similar physical devices. Alternatively, different storage operation cells may contain some of the same physical devices and not others. For example, a storage operation cell configured to perform SRM tasks may contain a secondary storage computing device 265, client 230, or other network device connected to a primary storage volume, while a storage operation cell configured to perform HSM tasks may instead include a secondary storage computing device 265, client 230, or other network device connected to a secondary storage volume and not contain the elements or components associated with and including the primary storage volume. (The term "connected" as used herein does not necessarily require a physical connection; rather, it could refer to two devices that are operably coupled to each other, communicably coupled to each other, in communication with each other, or more generally, refer to the capability of two devices to communicate with each other.) These two storage operation cells, however, may each include a different storage manager 205 that coordinates storage operations via the same secondary storage computing devices 265 and storage devices 215. This "overlapping" configuration allows storage resources to be accessed by more than one storage manager 205, such that multiple paths exist to each storage device 215 facilitating failover, load balancing, and promoting robust data access via alternative routes.

Alternatively or additionally, the same storage manager 205 may control two or more storage operation cells (whether or not each storage operation cell has its own dedicated storage manager 205). Moreover, in certain embodiments, the extent or type of overlap may be user-defined (through a control console) or may be automatically configured to optimize data storage and/or retrieval.

Data agent 295 may be a software module or part of a software module that is generally responsible for performing storage operations on the data of the client 230 stored in data store 260/262 or other memory location. Each client 230 may have at least one data agent 295 and the system 200 can support multiple clients 230. Data agent 295 may be distributed between client 230 and storage manager 205 (and any other intermediate components), or it may be deployed from a remote location or its functions approximated by a remote process that performs some or all of the functions of data agent 295.

The overall system 200 may employ multiple data agents 295, each of which may perform storage operations on data associated with a different application. For example, different individual data agents 295 may be designed to handle Microsoft Exchange data, Lotus Notes data, Microsoft Windows 2000 file system data, Microsoft Active Directory Objects data, and other types of data known in the art. Other examples may employ one or more generic data agents 295 that can handle and process multiple data types rather than using the specialized data agents described above.

If a client 230 has two or more types of data, one data agent 295 may be required for each data type to perform storage operations on the data of the client 230. For example, to back up, migrate, and restore all the data on a Microsoft Exchange 2000 server, the client 230 may use one Microsoft Exchange 2000 Mailbox data agent 295 to back up the Exchange 2000 mailboxes, one Microsoft Exchange 2000 Database data agent 295 to back up the Exchange 2000 databases, one Microsoft Exchange 2000 Public Folder data agent 295 to back up the Exchange 2000 Public Folders, and one Microsoft Windows 2000 File System data agent 295 to back up the file system of the client 230. These data agents 295 would be treated as four separate data agents 295 by the system even though they reside on the same client 230.

Alternatively, the overall system 200 may use one or more generic data agents 295, each of which may be capable of handling two or more data types. For example, one generic data agent 295 may be used to back up, migrate and restore Microsoft Exchange 2000 Mailbox data and Microsoft Exchange 2000 Database data while another generic data agent 295 may handle Microsoft Exchange 2000 Public Folder data and Microsoft Windows 2000 File System data, and so on.

Data agents 295 may be responsible for arranging or packing data to be copied or migrated into a certain format, such as an archive file. Nonetheless, it will be understood that this represents only one example, and any suitable packing or containerization technique or transfer methodology may be used if desired. Such an archive file may include metadata, a list of files or data objects copied, the file, and data objects themselves. Moreover, any data moved by the data agents may be tracked within the system by updating indexes associated with appropriate storage managers 205 or secondary storage computing devices 265. As used herein, a file or a data object refers to any collection or grouping of bytes of data that can be viewed as one or more logical units.

Storage manager 205 may be a software module or other application that coordinates and controls storage operations performed by the system 200. Storage manager 205 may communicate with some or all elements of the system 200, including clients 230, data agents 295, secondary storage computing devices 265, and storage devices 215, to initiate and manage storage operations (e.g., backups, migrations, data recovery operations), and so on.

Storage manager 205 may include a jobs agent 220 that monitors the status of some or all storage operations previously performed, currently being performed, or scheduled to be performed by the system 200. Jobs agent 220 may be communicatively coupled to an interface agent 225 (e.g., a software module or application). Interface agent 225 may include information processing and display software, such as a graphical user interface ("GUI"), an application programming interface ("API"), or other interactive interface through which users and system processes can retrieve information about the status of storage operations. For example, in an arrangement of multiple storage operations cell, through interface agent 225, users may optionally issue instructions to various storage operation cells regarding performance of the storage operations as described and contemplated herein. For example, a user may modify a schedule concerning the number of pending snapshot copies or other types of copies scheduled as needed to suit particular needs or requirements. As another example, a user may employ the GUI to view the status of pending storage operations in some or all of the storage operation cells in a given network, to monitor the status of certain components in a particular storage operation cell (e.g., the amount of storage capacity left in a particular storage device 1015), to provide criteria for searches of data stored in storage devices, and so on.

Storage manager 205 may also include a management agent 231 that is typically implemented as a software module or application program. In general, management agent 231 provides an interface that allows various management agents 231 in other storage operation cells to communicate with one another. For example, assume a certain network configuration includes multiple storage operation cells hierarchically arranged or otherwise logically related in a WAN or LAN configuration. With this arrangement, each storage operation cell may be connected to the other through each respective interface agent 225. This allows each storage operation cell to send and receive certain pertinent information from other storage operation cells, including status information, routing information, information regarding capacity and utilization, etc. These communications paths may also be used to convey information and instructions regarding storage operations.

For example, a management agent 231 in a first storage operation cell may communicate with a management agent 231 in a second storage operation cell regarding the status of storage operations in the second storage operation cell. Another illustrative example includes the case where a management agent 231 in a first storage operation cell communicates with a management agent 231 in a second storage operation cell to control storage manager 205 (and other components) of the second storage operation cell via management agent 231 contained in storage manager 205.

Another example is the case where management agent 231 in a first storage operation cell communicates directly with and controls the components in a second storage operation cell and bypasses the storage manager 205 in the second storage operation cell. If desired, storage operation cells can also be organized hierarchically such that hierarchically superior cells control or pass information to hierarchically subordinate cells or vice versa.

Storage manager 205 may also maintain an index, a database, or other data structure 211. The data stored in database 211 may be used to indicate logical associations between components of the system, user preferences, management tasks, media containerization and data storage information, or other useful data. For example, the storage manager 205 may use data from database 211 to track logical associations between secondary storage computing device 265 and storage devices 215 (or movement of data as containerized from primary to secondary storage).

Generally speaking, the secondary storage computing device 265, which may also be referred to as a media agent, may be implemented as a software module that conveys or transfers data, as directed by storage manager 205, between a client 230 and one or more storage devices 215, such as a tape library, a magnetic media storage device, an optical media storage device, or any other suitable storage device. In some examples, secondary storage computing device 265 may be communicatively coupled to and control a storage device 215. A secondary storage computing device 265 may be considered to be associated with a particular storage device 215 if that secondary storage computing device 265 is capable of routing and storing data to that particular storage device 215.

In operation, a secondary storage computing device 265 associated with a particular storage device 215 may instruct the storage device to use a robotic arm or other retrieval means to load or eject a certain storage media, and to subsequently archive, migrate, or restore data to or from that media. Secondary storage computing device 265 may communicate with a storage device 215 via a suitable communications path such as a SCSI or Fibre Channel communications link. In some embodiments, the storage device 215 may be communicatively coupled to the storage manager 205 via a SAN.

Each secondary storage computing device 265 may maintain an index, a database, or other data structure 261 that may store index data generated during storage operations for secondary storage (SS) as described herein, including creating a metabase (MB). For example, performing storage operations on Microsoft Exchange data may generate index data. Such index data provides a secondary storage computing device 265 or other external device with a fast and efficient mechanism for locating data stored or backed up. Thus, a secondary storage computing device index 261, or a database 211 of a storage manager 205, may store data associating a client 230 with a particular secondary storage computing device 265 or storage device 215, for example, as specified in a storage policy, while a database or other data structure in secondary storage computing device 265 may indicate where specifically the data of the client 230 is stored in storage device 215, what specific files were stored, and other information associated with storage of the data of the client 230. In some examples, such index data may be stored along with the data backed up in a storage device 215, with an additional copy of the index data written to index cache in a secondary storage device. Thus the data is readily available for use in storage operations and other activities without having to be first retrieved from the storage device 215.

Generally speaking, information stored in a cache is typically recent information that reflects certain particulars about operations that have recently occurred. After a certain period of time, this information is sent to secondary storage and tracked. This information may need to be retrieved and uploaded back into a cache or other memory in a secondary computing device before data can be retrieved from storage device 215. In some examples, the cached information may include information regarding format or containerization of archives or other files stored on storage device 215.

One or more of the secondary storage computing devices 265 may also maintain one or more single instance databases 223. Single instancing (alternatively called data deduplication) generally refers to storing in secondary storage only a single instance of each data object (or data block) in a set of data (e.g., primary data). More details as to single instancing may be found in one or more of the following previously-referenced U.S. patent application Ser. Nos. 11/269,512, 12/145,347, 12/145,342, 11/963,623, 11/950,376, and 61/100,686, which are incorporated by reference in their entirety.

In some examples, the secondary storage computing devices 265 maintain one or more variable instance databases. Variable instancing generally refers to storing in secondary storage one or more instances, but fewer than the total number of instances, of each data object (or data block) in a set of data (e.g., primary data). More details as to variable instancing may be found in the previously-referenced U.S. Patent Application No. 61/164,803, which is incorporated by reference in its entirety.

In some embodiments, certain components may reside and execute on the same computer. For example, in some embodiments, a client 230 such as a data agent 295, or a storage manager 205, coordinates and directs local archiving, migration, and retrieval application functions as further described in the previously-referenced U.S. patent application Ser. No. 09/610,738, which is incorporated by reference in its entirety. This client 230 can function independently or together with other similar clients 230.

The secondary storage computing devices 265 each has its own associated metabase 261. Each client 230 may also have its own associated metabase 270. However in some embodiments, each "tier" of storage, such as primary storage, secondary storage, tertiary storage, etc., may have multiple metabases or a centralized metabase, as described herein. For example, rather than a separate metabase or index associated with each client 230, the metabases on this storage tier may be centralized. Similarly, second and other tiers of storage may have either centralized or distributed metabases. Moreover, mixed architecture systems may be used if desired, that may include a first tier centralized metabase system coupled to a second tier storage system having distributed metabases and vice versa, and so on.

Moreover, in operation, a storage manager 205 or other management module may keep track of certain information that allows the storage manager 205 to select, designate, or otherwise identify metabases to be searched in response to certain queries as further described herein. Movement of data between primary and secondary storage may also involve movement of associated metadata and other tracking information as further described herein.

In some examples, primary data may be organized into one or more sub-clients. A sub-client is a portion of the data of one or more clients 230, and can contain either all of the data of the clients 230 or a designated subset thereof. As depicted in FIG. 10, the data store 262 includes two sub-clients. For example, an administrator (or other user with the appropriate permissions; the term administrator is used herein for brevity) may find it preferable to separate email data from financial data using two different sub-clients having different storage preferences, retention criteria, and so on.

In some examples, the data storage system 200 includes a content indexing component (not shown). The context indexing component may select a copy of data to be indexed or stored, identify content within the copy of the data, and update an index of content to make the content available for searching or other purposes. For example, the component may add information such as the location of the content, keywords found within the content, and other supplemental information about the content that may be helpful for locating the content during a search.

Creating Secondary Copies of Data Based on Received Search Criteria

Figure 3:
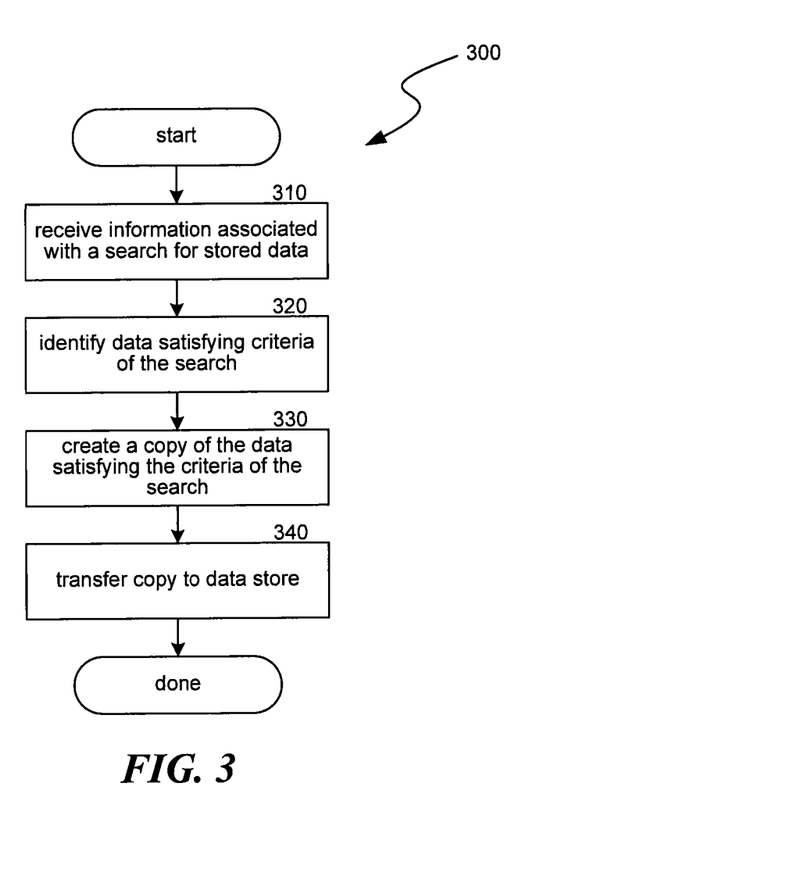
FIG. 3 is a flow diagram illustrating a routine for creating a secondary copy of data based on a search for data.

As described herein, in some examples, the system creates secondary copies of data identified during a search of a data store, such as secondary or tertiary storage. FIG. 3 is a flow diagram illustrating a routine 300 for creating a secondary copy of data based on a search for data in a data store.

In step 310, the system receives information associated with a search for stored data, such as a request to restore data whose contents satisfy a certain search criteria. For example, the search component 112 may receive a request to retrieve data from a secondary data store, such as an archive data store.

In step 320, the system identifies data that satisfies the search request. For example, the search component 112 may perform a lookup operation on one or more indices, such as a content index, to search for and identify a set of data that satisfies the criteria of the search request. In some cases, the system may identify data stored in secondary or tertiary data store, such as archive data, backup data, and so on. In some examples, the search criteria are received from a user, such as a database administrator. The search criteria may be associated with discovery requests for data, audits or compliance requests for data, research purposes, and so on.

In step 330, the system creates a copy of the data whose contents satisfy the criteria of the search. For example, the copy component 116, which may be one or more media agents described herein, may perform a number of different copy operations when creating or making a copy of the data whose contents satisfy a received search criteria, as discussed herein.

In step 340, the system transfers the created copy to a data store. For example, the system, via the copy component 116 or another component, may transfer the created copy to secondary storage, tertiary storage, or possibly primary storage, depending on the needs of a requestor. In some cases, the system transfers the created copy to the data store that contained the searched data. Example data stores will now be discussed.

Figure 4:
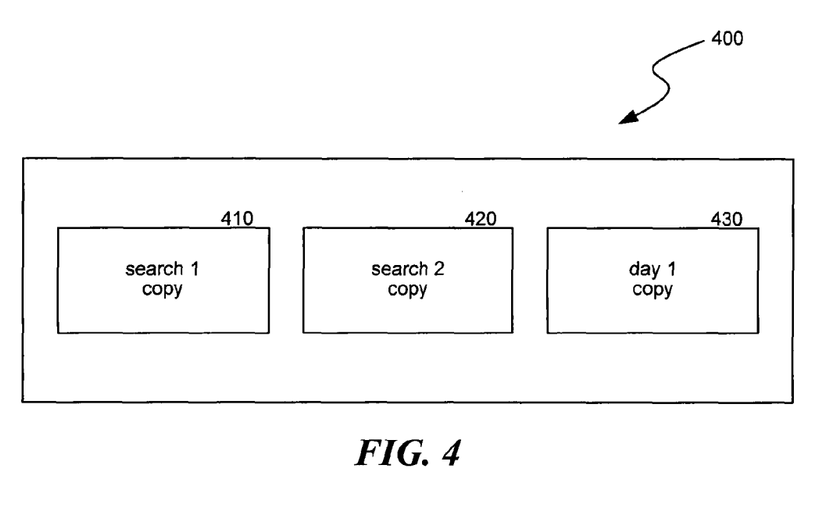
FIG. 4 is a block diagram illustrating secondary storage media containing secondary copies of data.

FIG. 4 is a block diagram illustrating secondary storage media 400 containing secondary copies of data. The storage media 400 includes a first search-based copy of data ("search1") 410, a second search-based copy of data ("search2") 420, and other non search-based copies of data ("day1"), such as a copy of data produced within a certain time period.

In some examples, the system may create copies of data in order to stage backup copies in anticipation of future requests for data. In some cases, the system may identify certain search criteria, apply the search criteria to a data store, identify groups of data that satisfy the search criteria, and create a copy of each of the identified groups. In some cases, the system may stage and create copies of data, storing the copies as distinct buckets of data whose contents satisfy search criteria. For example, the search1 copy 410 of data store 400 may be associated with search criteria for a sender's name of an email, while the search2 copy 420 of data store 400 may be associated with the same name as a recipient of an email.

Figure 5:
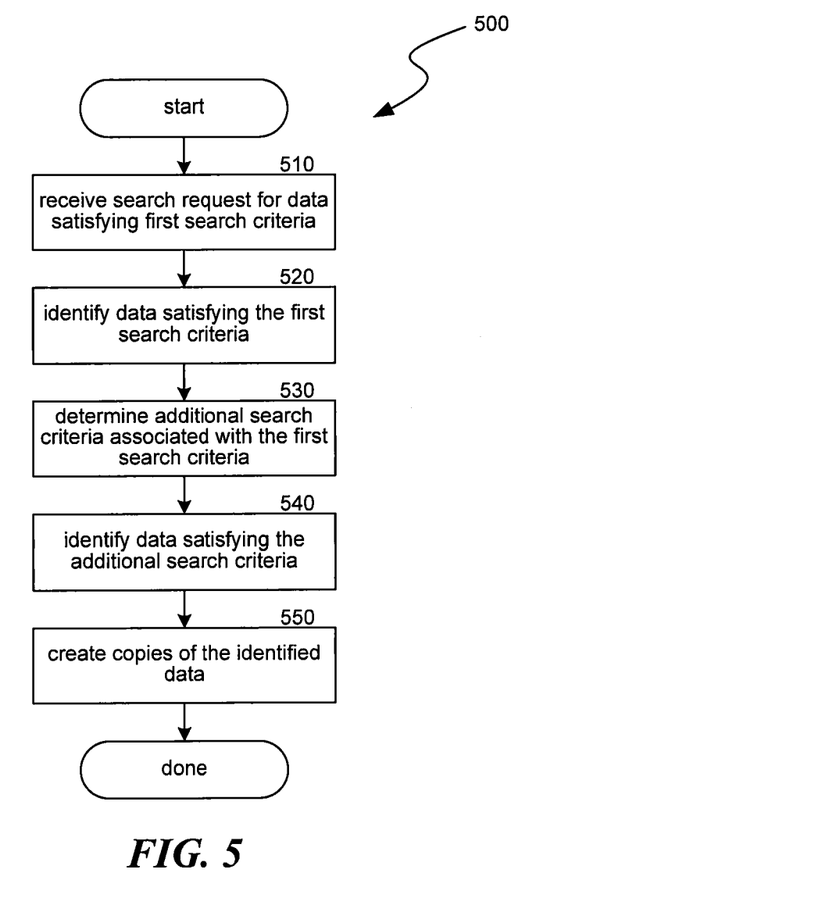
FIG. 5 is a flow diagram illustrating a routine for creating a secondary copy of data based on a search for data and associated information.

In some examples, the system may create copies of data whose contents satisfy received search criteria as well as data whose contents satisfy search criteria associated with and/or related to the received search criteria. FIG. 5 is a flow diagram illustrating a routine 500 for creating a secondary copy of data based on a search for data and based on associated searches for data.

In step 510, the system receives a search request for data that satisfies first search criteria. For example, the system, via a search component 112, receives a search request for data whose contents include a certain keyword, name, parameter, and so on. In step 520, the system identifies data whose contents satisfy the search request. For example, the search component 112 searches an index of a data store for data whose contents satisfy the first search criteria, and generates a set of results of data that satisfy the criteria.

In step 530, the system determines that there are additional or other search criteria associated with the first search criteria. The system may maintain a table or other data structure of associated search criteria. The criteria may be associated based on the type of data, based on previous restoration requests, based on corporate relationships, based on previous user requests, and so on. For example, the system may associate the name of a CEO of a company with the names of the CTO, CIO, and CFO, as historical information associated with discovery requests related to that company indicates the requests often included requests for data files from the CEO as well as the CTO, CIO, and CFO.

In step 540, the system identifies data whose contents satisfy the additional or other search criteria. For example, the search component 112 searches an index of the data store for data whose contents satisfy the associated search criteria, and generates a set of results of data that satisfy the criteria. In step 550, the system, via a copy component 114, creates a copy of the identified data. For example, the copy component 114 creates a secondary copy of the data whose contents satisfy the first search criteria and the associated search criteria.

The following examples illustrate how the system may apply to real world scenarios. One of ordinary skill will appreciate that other applications are of course possible.

During an ongoing litigation, a company is advised to prepare for the discovery phase by collecting all emails from a certain time period. The company, wishing to avoid the high legal fees associated with discovery, employs aspects of the system described herein by searching a data store containing all the emails for emails whose contents include keywords associated with the litigation. Once the emails whose contents include keywords associated with the litigation are identified, the system creates copies of the data associated with each keyword, creating data buckets for every keyword. Thus, the company avoids a lengthy and costly discovery phase of the litigation by staging the data stored in its archives into buckets of data grouped by search criteria.

In order to satisfy future compliance requests, a bank may utilize the system described herein to create copies of data grouped based on a number of different criteria. The system searches the bank's data archives for data whose contents include information likely to be requested, creates copies of data that includes the information likely to be requested, and stores the copies in the archives for the expected compliance requests.

Restoring Data from Search Based Secondary Copies of Data

As described herein, in some examples, the system creates secondary copies of data that contain data whose contents are identified during searches within data stores. In some examples, these secondary copies may be restored for data recovery or data request purposes. Additionally, in some examples, such storage may facilitate improved or anticipatory data recovery, among other benefits.

Figure 6:
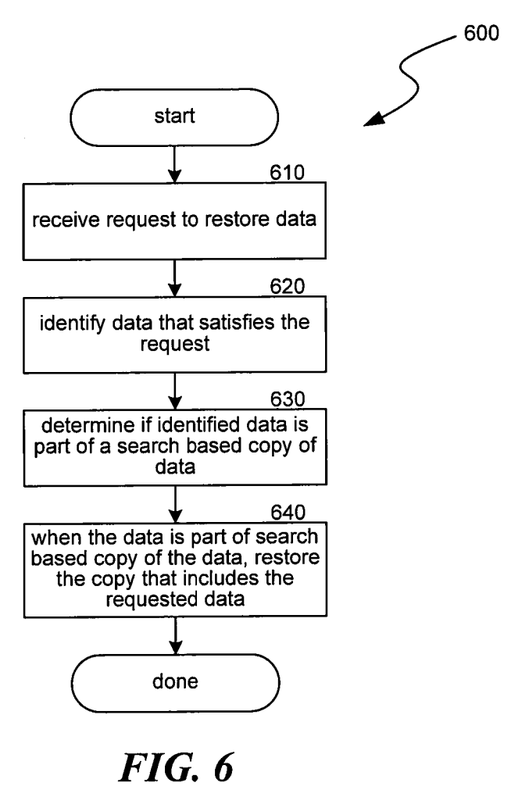
FIG. 6 is a flow diagram illustrating a routine for restoring data from search based secondary copies of data.

FIG. 6 is a flow diagram illustrating a routine 600 for restoring data from search based secondary copies of data. In step 610, the system receives a request to restore data. For example, the system receives a request to restore data from secondary storage media, such as magnetic tape. The received request may identify data to be restored based on metadata associated with the data, such as metadata that identifies a time period in which the data was copied and/or stored, the computing resources used to create and/or store the data, and so on.

In step 620, the system identifies the data that satisfies the request. For example, the system identifies a secondary copy of the data to be restored, such as a snapshot copy, archive copy, and so on. In step 630, the system determines if the identified data is part of or associated with a search-based copy of data for a data store. That is, the system may determine that a backup copy or other secondary copy was previously created for data whose content satisfied a search of the content of a data source.

In step 640, when the data is part of a search-based secondary copy of data, the system restores the requested data as well as the search-based secondary copy that includes the requested data. For example, the system restores the specifically requested data along with data deemed to be associated with the requested data based on a similarity of content determined by a previous search for content within a data store.

Thus, in some examples, creating search-based secondary copies, such as backup copies, of portions of a data store facilitates restoring additional data along with requested data, which may assist in reducing restoration requests because the system anticipates and stages data that may be associated with a later restoration request. For example, if the system receives a request to restore exchange data from a certain day, the system may identify other data whose content is similar to the content within that day's data (e.g., sender names, keywords from subject lines in emails) and restore that other data from the search-based copies described herein. Thus, the system may utilize search-based copies of data during restoration processes in order to recover data that may supplement and/or augment the data of a restoration request, among other benefits.

Conclusion

From the foregoing, it will be appreciated that specific embodiments of the system have been described herein for purposes of illustration, but that various modifications may be made without deviating from the spirit and scope of the system. Accordingly, the system is not limited except as by the appended claims.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

The above detailed description of embodiments of the system is not intended to be exhaustive or to limit the system to the precise form disclosed above. While specific embodiments of, and examples for, the system are described above for illustrative purposes, various equivalent modifications are possible within the scope of the system, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the system provided herein can be applied to other systems, not necessarily the system described above. The elements and acts of the various embodiments described above can be combined to provide further embodiments.

These and other changes can be made to the system in light of the above Detailed Description. While the above description details certain embodiments of the system and describes the best mode contemplated, no matter how detailed the above appears in text, the system can be practiced in many ways. Details of the system may vary considerably in implementation details, while still being encompassed by the system disclosed herein. As noted above, particular terminology used when describing certain features or aspects of the system should not be taken to imply that the terminology is being redefined herein to be restricted to any specific characteristics, features, or aspects of the system with which that terminology is associated. In general, the terms used in the following claims should not be construed to limit the system to the specific embodiments disclosed in the specification, unless the above Detailed Description section explicitly defines such terms. Accordingly, the actual scope of the system encompasses not only the disclosed embodiments, but also all equivalent ways of practicing or implementing the system under the claims.

While certain aspects of the system are presented below in certain claim forms, the inventors contemplate the various aspects of the system in any number of claim forms. For example, while only one aspect of the system is recited as embodied in a computer-readable medium, other aspects may likewise be embodied in a computer-readable medium. Accordingly, the inventors reserve the right to add additional claims after filing the application to pursue such additional claim forms for other aspects of the system.

I claim:

1. A non-transitory computer-readable medium having instructions for execution by a processor, the instructions comprising:
 a search component, wherein the search component is configured to search data within a data store of a storage cell to identify a set of data that satisfies first search criteria,
  wherein the data store is a secondary or tertiary storage device of the storage cell that stores backup copies of production data generated by at least one client device,
   wherein the secondary or tertiary storage device is remotely located from the at least one client device,
  wherein the storage cell does not contain a primary storage device that stores the production data generated by the at least one client device, such that a search of the data store of the storage cell excludes a search of the primary storage device,
  wherein the search component is configured to identify additional data that satisfies second search criteria and is associated with the set of data and that does not satisfy the first search criteria,
   wherein the second criteria include a business entity relationship with the set of data and include information about subsidiary business entities with respect to one or more business entities identified in the set of data;
 a copy component, wherein the copy component is configured to create a secondary copy of the identified set of data that satisfies the first search criteria and of the additional data,
  wherein the secondary copy of the identified set of data is one of a backup copy, a snapshot copy, and an archive copy;
  wherein the secondary copy of the identified set of data and of the additional data is created from the backup copies of production data stored on the secondary or tertiary storage device; and
 a transfer component, wherein the transfer component is configured to store the secondary copy of the identified set of data and the additional data to the secondary or tertiary storage device.

2. The computer-readable medium of claim 1, wherein the search component is configured to search for data that satisfies user selected criteria.

3. The computer-readable medium of claim 1, wherein the first search criteria includes at least one criterion associated with content within the data stored within the data store.

4. The computer-readable medium of claim 1, wherein the data store is contained on a certain secondary storage media, and the transfer component is configured to transfer the secondary copy to the certain secondary storage media.

5. The computer-readable medium of claim 1, wherein the instructions further comprise:
 an index component, wherein the index component is configured to update an index having entries relating secondary copies of data with media locations for the secondary copies with an entry for the created secondary copy.

6. The computer-readable medium of claim 1, wherein the instructions further comprise:
 a content component, wherein the content component is configured to determine content within the created secondary copy that is associated with other content within the data store; and
 an identification component, wherein the identification component is configured to identify data stored in the data store that includes the other content;
 wherein the copy component is configured to create a secondary copy of data that includes data that satisfies the first search criteria and the identified data that includes the other content.

7. A computer-implemented method for creating a copy of data stored in secondary or tertiary storage media, the method comprising:
 receiving, by a computing device, information associated with a search for data stored in the secondary or tertiary storage media and not in a primary storage device of the computing device,
  wherein the secondary or tertiary storage media is remotely located from the computing device;
 identifying data within the secondary or tertiary storage media that satisfies one or more criteria of the search;
 determining additional criteria that is associated with and different than the one or more criteria of the search,
  wherein the additional criteria is based on a business entity relationship between the additional criteria and the one or more search criteria;
 identifying additional data that satisfies the determined additional criteria,
  wherein the additional criteria include information about subsidiary business entities that are subsidiary with respect to one or more business entities identified in the set of data;
 generating a copy of the data that satisfies the criteria of the search and of the additional data that satisfies the additional criteria, wherein the copy of the data that satisfies the criteria of the search and the additional data that satisfies the determined additional criteria is created from backup copies of production data stored on the secondary or tertiary storage media,
  wherein the copy of the data and the additional data is formatted differently than an original copy of the production data from which the backup copies were created; and
 transferring the generated copy of the data and the additional data to the secondary or tertiary storage media to make results of the search accessible in a shorter amount of time than separately performing the search for the one or more search criteria and the additional criteria.

8. The method of claim 7, wherein receiving information associated with the search for data includes receiving information associated with a request for restoring data from a data archive that satisfies certain search criteria.

9. The method of claim 7, wherein identifying data that satisfies the one or more criteria of the search includes identifying data located in at least two distinct secondary copies of data.

10. The method of claim 7, wherein identifying data that satisfies the one or more criteria of the search includes identifying data located in at least two distinct secondary storage media.

11. The method of claim 7, wherein generating a copy of the data that satisfies the criteria of the search includes generating a backup copy of data for a primary data store.

12. The method of claim 7, wherein transferring the generated copy to the secondary storage media includes transferring the generated copy to secondary or tertiary storage media that contains at least a portion of the searched data.

13. A computer-implemented method of restoring information located in secondary or tertiary storage data stores, the method comprising:

receiving, by a computing device, first search terms as part of a request to restore a first data set located in the secondary or tertiary storage data stores,
wherein the first data set includes portions of multiple backup copies of production data stored in the secondary or tertiary storage data stores that are located remotely from the computing device, wherein secondary and tertiary storage data stores are different than a primary storage device for the computing device;

automatically generating second search terms based on a business entity relationship with the first search terms;

identifying a second data set in the secondary or tertiary storage data stores based on the second search terms,
wherein the second search terms include information about subsidiary business entities that are subsidiary with respect to one or more business entities identified in the first set of data;

locating storage media containing the secondary or tertiary data stores and the first data set and the second data set within the secondary or tertiary data stores;

retrieving the first data set and the second data set from the located storage media containing the first data set and the second data set; and storing the first data set and the second data set to a secondary storage device.

14. The method of claim 13, wherein locating storage media containing the first data set and the second data set includes locating a secondary copy of results of the previous search for information.

15. The method of claim 13, wherein receiving the request to restore the first data set includes receiving a request to restore data produced in a specified time period; and wherein at least a portion of data within the second data set is produced in a time period different than the specified time period.

16. The method of claim 13, wherein receiving the request to restore the first data set includes receiving a request to restore data produced at a specified location; and wherein at least a portion of data within the second data set is produced at a location different than the specified location.

17. The method of claim 13, wherein receiving the request to restore the first data set includes receiving a request to restore data produced by a specified user; and wherein at least a portion of data within the second data set is produced by a user different than the specified user.

18. The method of claim 13, wherein the compliance-related request is associated with a legal discovery request for data whose contents satisfy certain criteria.

19. A computer-implemented method for generating a backup set of search query data, the method comprising:

running, with a computing device, a first query on the content of secondary copies of production data stored in multiple secondary storage devices that are different than a primary storage device of the computing device and that are located remotely from the computing device;

automatically running a second query on the content of the secondary copies based on a type of data defined by the first query and based on a business entity relationship with the first query;

extracting, from the multiple secondary storage devices, data whose content satisfies the first query and the second query,
wherein the second query includes information about subsidiary business entities that are subsidiary with respect to one or more business entities identified in the set of data;

making a copy of the extracted data whose content satisfies the first query and the second query; and storing the copy of the extracted data whose content satisfies the first query and the second query to make the copy of the extracted data more quickly accessible than running the first query and the second query.

* * * * *

UNITED STATES PATENT AND TRADEMARK OFFICE
CERTIFICATE OF CORRECTION

| | | |
|---|---|---|
| PATENT NO. | : 8,719,264 B2 | Page 1 of 1 |
| APPLICATION NO. | : 13/076714 | |
| DATED | : May 6, 2014 | |
| INVENTOR(S) | : Prakash Varadharajan | |

It is certified that error appears in the above-identified patent and that said Letters Patent is hereby corrected as shown below:

Title Page

On page 3, item (56) in column 2, under "Other Publications", line 16, delete "avaliable" and insert -- available --, therefor.

On page 4, item (56) in column 2, under "Other Publications", line 30, delete "Dec. 20, 2008," and insert -- Dec. 30, 2008, --, therefor.

Signed and Sealed this
Twelfth Day of August, 2014

Michelle K. Lee
*Deputy Director of the United States Patent and Trademark Office*